(12) United States Patent
Sivley, IV (10) Patent No.: US 6,607,220 B2
(45) Date of Patent: Aug. 19, 2003

(54) RADIALLY EXPANDABLE TUBULAR CONNECTION

(75) Inventor: Robert S. Sivley, IV, Kingwood, TX (US)

(73) Assignee: Hydril Company, Houston, TX (US)

( * ) Notice: Subject to any disclaimer, the term of this patent is extended or adjusted under 35 U.S.C. 154(b) by 0 days.

(21) Appl. No.: 09/973,441

(22) Filed: Oct. 9, 2001

(65) Prior Publication Data

US 2003/0067166 A1 Apr. 10, 2003

(51) Int. Cl.[7] ............................. F16L 15/00; E21B 17/08
(52) U.S. Cl. ....................... 285/334; 285/333; 285/355; 285/390; 285/382; 285/382.4; 285/382.5; 285/92; 166/207
(58) Field of Search ................................. 285/333, 334, 285/355, 390, 92, 382, 382.4, 382.5, 148.8; 166/207

(56) References Cited

U.S. PATENT DOCUMENTS

| RE30,647 E | 6/1981 | Blose |
|---|---|---|
| 4,703,954 A | 11/1987 | Ortloff et al. |
| RE34,467 E | 12/1993 | Reeves |
| 5,348,095 A | 9/1994 | Worrall et al. |
| 5,423,579 A | 6/1995 | Blose et al. |
| 5,454,605 A | 10/1995 | Mott |
| 5,924,745 A | 7/1999 | Campbell |
| 5,984,568 A | 11/1999 | Lohbeck |
| 6,044,906 A | 4/2000 | Saltel |

*Primary Examiner*—Lynne H. Browne
*Assistant Examiner*—G M Collins
(74) *Attorney, Agent, or Firm*—Rosenthal & Osha L.L.P.

(57) ABSTRACT

A radially expandable tubular connection including a box member having an internal thread and a first seal surface and a pin member having an external thread and a second seal surface. The external thread threadedly engages the internal thread and the first and second seal surfaces form a metal-to-metal seal upon engagement of the seal surfaces. At least one groove is formed on an outer surface of the box member, and the at least one groove is shaped so that the box member radially deforms in a direction toward the pin member in a region near the metal-to-metal seal after radial plastic expansion of the pin and box members after engagement of the threads.

37 Claims, 8 Drawing Sheets

Expansion Tool Travel Direction

RADIALLY EXPANDABLE TUBULAR CONNECTION

BACKGROUND OF THE INVENTION

1. Field of the Invention

This invention relates generally to threaded connections adapted for use with oilfield pipe ("tubulars"). More specifically, the invention relates to threaded connections formed on downhole tubular members adapted to be plastically radially expanded in a wellbore.

2. Background Art

Casing joints, liners, and other oilfield tubulars are often used in drilling, completing, and producing a well. Casing joints, for example, may be emplaced in a wellbore to stabilize a formation, to protect a formation against elevated wellbore pressures (e.g., wellbore pressures that exceed a formation pressure), and the like. Casing joints may be coupled in an end-to-end manner by threaded connections, welded connections, and other connections known in the art. The connections may be designed so as to form a seal between an interior of the coupled casing joints and an annular space formed between exterior walls of the casing joints and walls of the wellbore. The seal may be, for example, an elastomer seal (e.g., an o-ring seal), a metal-to-metal seal formed proximate the connection, or similar seas known in the art.

In some well construction operations, it is advantageous to radially plastically expand threaded pipe or casing joints in a drilled ("open") hole or inside a cased wellbore. In a cased wellbore, radially expandable casing can be used to reinforce worn or damaged casing so as to, for example, increase a burst rating of the old casing, thereby preventing premature abandonment of the hole. In open hole sections of the wellbore, the use of radially expandable casing may reduce a required diameter of a drilled hole for a desired final cased hole diameter, and may also reduce a required volume of cement required to fix the casing in wellbore.

Deformations proximate ends of radially expandable casing after radial plastic expansion are problematic when they are encountered proximate threaded tubular connections used on, for example, oilfield casing and tubing. Problems are encountered in at least three areas. First, internal metal-to-metal seals, which rely on radial contact stresses to form the seal, may unload if a pin nose formed on a pin connection deforms in a direction away from a seal surface formed on a box connection. Second, gross deformation of the pipe ends proximate the region of the threaded connection can cause some of the threads to move radially and, as a result, unload. This adversely affects a load carrying capacity of the threaded connection. Third, local deformations in the region proximate each individual thread may "twist" the individual threads, thereby adversely affecting a load distribution between individual threads.

When a cold-forming expansion process is used (e.g., when a cold-forming expansion tool or "pig" is moved through a casing string so as to radially plastically expand the casing string), the casing string is usually run into the hole "box-down" (e.g., the "box" or female threaded connection is run into the hole facing downhole so that the expansion tool ("pig") does not deform the pin nose of each connection when the expansion tool is forced upward through the casing string). Note that tubular strings such as drill pipe, casing, or similar tubular members are normally run into the hole "pin-down" because it is easier to make up the threaded connections in the tubular string.

Several problems have been encountered when attempting to maintain an effective internal pressure seal in threaded connections used with expanded casing strings. For example, elastomeric seals may be used in these applications, but a preferred internal pressure seal in oilfield applications includes a metal-to-metal pressure energized, gas-tight seal. Elastomeric seals impose limitations on the design the threaded connection itself, usually require specialized manufacturing techniques, impose limitations upon the materials that may be used, and do not provide the security of a true metal-to-metal seal.

Prior art analysis of expandable threaded tubular connections has concentrated on an analysis of the post-expansion stresses in the connection, with an implicit assumption that a relationship between stress and strain is relatively linear, even within the plastic deformation regime. However, thin-walled carbon steels typical of those used in oilfield tubular goods exhibit a drastically non-linear relationship between stress and strain during plastic deformation, particularly in a near-plastic region immediately following a yield point where plastic yielding is characterized by the formation of Lüders bands. For this reason, it is desirable that expandable threaded tubular connections be designed to control and focus the plastic strains resulting from expansion rather than be designed to achieve a desired stress field in the connection so that threaded connection and seal integrity may be maintained after radial plastic expansion of the threaded connection (and the associated tubular member on which the threaded connection is formed).

SUMMARY OF THE INVENTION

In one aspect, the invention comprises a radially expandable tubular connection. The radially expandable tubular connection includes a box member comprising an internal thread and a first seal surface and a pin member comprising an external thread and a second seal surface. The external thread is adapted to threadedly engage the internal thread and the first and second seal surfaces are adapted to form a metal-to-metal seal upon engagement thereof. At least one groove is formed on an outer surface of the box member, and the at least one groove is shaped so that the box member radially deforms in a direction toward the pin member axially proximate the metal-to-metal seal upon radial plastic expansion of the pin and box members after engagement of the threads.

In another aspect, the invention comprises a radially expandable tubular connection. The radially expandable tubular connection includes a box member comprising an internal thread and a first seal surface and a pin member comprising an external thread and a second seal surface. The external thread is adapted to threadedly engage the internal thread and the first and second seal surfaces are adapted to form a metal-to-metal seal upon engagement thereof. At least one groove is formed on an outer surface of the box member axially proximate the first seal surface, and the at least one groove is shaped so that the box member radially deforms in a direction toward the pin member axially proximate the metal-to-metal seal upon radial plastic expansion of the pin and box members after engagement of the threads.

In another aspect, the invention comprises a radially expandable tubular connection. The radially expandable tubular connection includes a box member comprising an internal thread and a first seal surface and a pin member comprising an external thread and a second seal surface. The external thread is adapted to threadedly engage the internal thread and the first and second seal surfaces are adapted to form a metal-to-metal seal upon radial plastic expansion of the pin and box members after engagement of the threads. At least one groove is formed on an inner surface of the box member, and the at least one groove is adapted so that the box member radially deforms in a direction toward the pin member proximate the seal surfaces after the radial plastic expansion.

In another aspect, the invention comprises a radially expandable tubular connection. The radially expandable tubular connection includes a box member comprising an internal thread and a first seal surface and a pin member comprising an external thread and a second seal surface. The external thread is adapted to threadedly engage the internal thread and the first and second seal surfaces are adapted to form a metal-to-metal seal upon engagement thereof. At least one pin groove is formed on an outer surface of the pin member between a last engaged thread and a pin nose, and the at least one pin groove adapted to reduce an amount of radially inward deformation of the pin member upon radial plastic expansion of the pin and box members after engagement of the threads.

In another aspect, the invention comprises a radially expandable tubular connection. The radially expandable tubular connection includes a box member comprising an internal thread and a first seal surface and a pin member comprising an external thread and a second seal surface. The external thread is adapted to threadedly engage the internal thread and the first and second seal surfaces are adapted to form a metal-to-metal seal upon engagement thereof. At least one substantially helical groove is formed on an inner surface of the pin member, and the substantially helical groove is positioned at substantially a same axial position along the pin member as roots of the external thread. The at least one substantially helical groove is adapted to reduce an amount of radially inward deformation of the pin member upon radial plastic expansion of the pin and box members after engagement of the threads.

In another aspect, the invention comprises a radially expandable tubular connection. The radially expandable tubular connection includes a box member comprising an internal thread and a first seal surface and a pin member comprising an external thread and a second seal surface. The external thread is adapted to threadedly engage the internal thread and the first and second seal surfaces are adapted to form a metal-to-metal seal upon engagement thereof. A plurality of circumferential pin grooves are formed on an inner surface of the pin member. Each of the plurality of substantially circumferential pin grooves is positioned at substantially a same axial position along the pin member as a root of the external thread, and the plurality of circumferential pin grooves are adapted to reduce an amount of radially inward deformation of the pin member upon radial plastic expansion of the pin and box members after engagement of the threads.

In another aspect, the invention comprises a radially expandable tubular connection. The radially expandable tubular connection includes a box member comprising an internal thread and a first seal surface and a pin member comprising an external thread and a second seal surface. The external thread is adapted to threadedly engage the internal thread and the first and second seal surfaces are adapted to form a metal-to-metal seal upon engagement thereof. At least one substantially helical groove is formed proximate a root surface of the external thread, and the at least one substantially helical groove is adapted to reduce an amount of radial deformation of the external thread upon radial plastic expansion of the pin and box members after engagement of the threads.

Other aspects and advantages of the invention will be apparent from the following description and the appended claims.

DETAILED DESCRIPTION

An expansion tool is typically used to plastically radially expand a string of casing or tubing disposed inside a wellbore from an initial condition (e.g., from an initial diameter) to an expanded condition (e.g., with a larger diameter). One common prior-art expansion process shown in FIG. 1 uses a conically tapered, cold-forming expansion tool 101 (commonly referred to as a "pig") to expand casing in a wellbore. The expansion tool 101 is generally attached to a lower end of a casing string that is run into the wellbore. A leading mandrel 99 of the expansion tool 101 generally comprises a cylinder with an external diameter D1 that is less than a "drift" diameter of the made-up casing or tubing that is to be radially expanded. The expansion tool 101 includes a tapered section 98A having a taper angle 98B that is generally between 5 degrees and 45 degrees. The expansion tool 101 is generally symmetric about a longitudinal axis 97 thereof. The expansion tool 101 also includes a cylindrical section 96 having a diameter D2 typically corresponding to a desired expanded inner diameter of a casing string (not shown) that is followed by a tapered section 95.

Figures 1, 2A:
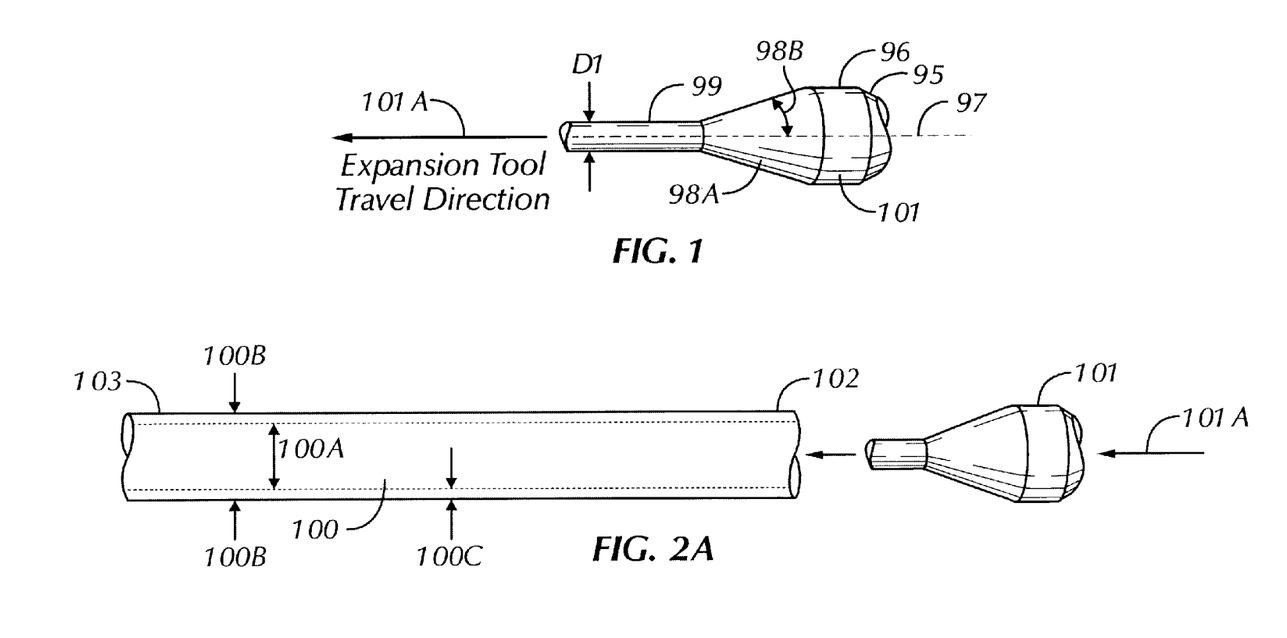
FIG. 1 shows a typical radial expansion tool.
FIG. 2A shows an unexpanded joint of plain-end pipe.

After the casing string is set in place in the hole, usually by hanging-off the casing string from a casing hanger, a working string of drillpipe or tubing is run in to the wellbore and attached to the expansion tool 101 (e.g., the working string is generally attached to the leading mandrel 99). The expansion tool 101 may also comprise an axial bore therethrough (not shown) so that pressurized fluid (e.g., drilling fluid) may be pumped through the working string, through the expansion tool 101, and in to the wellbore so as to hydraulically pressurize the wellbore. Hydraulic pressure acts on a piston surface defined by a lower end of the expansion tool 101, and the hydraulic pressure is combined with an axial upward lifting force on the working string to force the expansion tool 101 upward through the casing string so as to outwardly radial displace the casing string to a desired expanded diameter. In this expansion process, a rate of radial expansion is determined by, for example, a total plastic strain required to expand the casing string, the taper angle 98A, and a rate of axial displacement of the expansion tool 101 through the casing string. Consistency of the expansion process is controlled by transitions along the expansion tool 101 and a cross-sectional area of, for example, lengths of casing that form the casing string, threaded connections that couple the length of casing, and the like.

The expansion tool 101 may be inserted into the casing string at either the bottom or the top, depending on the tool design and the application. Radial expansion may be performed at rates of, for example, 25 to 60 feet per minute. Other expansion processes, such as expansion under localized hydrostatic pressure, or "hydroforming," are known in the art, but are generally not used as much as the aforementioned cold-forming expansion process.

While the tapered expansion tool method has proven to work quite well on tubular bodies of casing strings, the expansion of made-up threaded connections has exposed structural sealing problems in the expanded threaded connections. Threaded connections that undergo radial expansion have a tendency to exhibit a non-uniform axial elongation and react differently to residual hoop stresses remaining after radial expansion. Specifically, male (pin) threaded members and female (box) threaded members deform differently during radial expansion. Depending on a direction of travel of the expansion tool (e.g., pin to box or box to pin), the second member to undergo radial expansion will generally move away from the first member. This differential displacement phenomenon results in a loss of preload in axially-engaged seals, making the use of conventional metal-to-metal seals (including, for example, shoulder seals) generally ineffective for plastically radially expanded casing and tubing.

Radial Plastic Expansion of Plain-End Pipe

When a joint of casing or tubing is radially plastically expanded, a wall thickness of the casing joint and an overall axial length of the casing joint are reduced by a process commonly referred to as "Poissoning," and residual stresses are retained in the casing joint. At any given finite element proximate a middle of the casing joint, the casing joint will maintain a substantially uniform diameter and wall thickness because each finite element experiences support from adjoining finite elements. However, deformation proximate ends of the casing joint depend on a direction in which the expansion tool travels.

FIG. 2A shows a joint of unexpanded plain-end pipe 100 with a nominal diameter-to-wall thickness ratio (d/t) of about 20. The pipe 100 is formed from, for example, 80,000 psi yield carbon steel. The pipe 100 has an inner diameter (ID) 100A, an outer diameter (OD) 100B, and a wall thickness 100C. The unexpanded pipe 100 is designed to be expanded with an expansion tool 101 that is generally moved through the pipe 100 in a direction 101A from an unexpanded first end 102 toward an unexpanded second end 103.

Figure 2B:
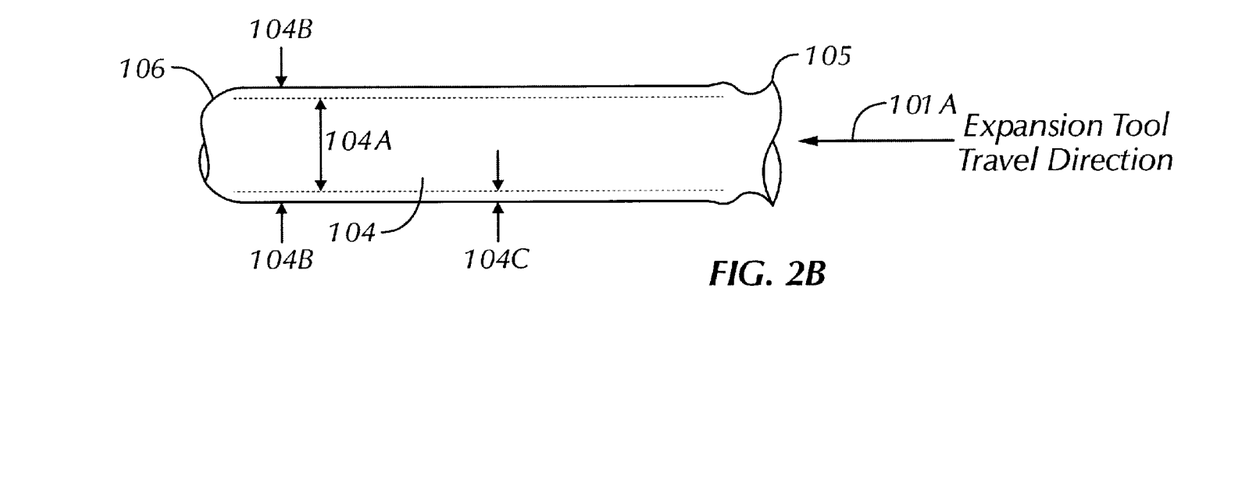
FIG. 2B shows a of the plain-end pipe joint shown in FIG. 2A after expansion.

FIG. 2B shows the joint of plain-end pipe 104 after it has been expanded. The expanded plain-end pipe 104 has an ID 104A, an OD 104B, and a wall thickness 104C. The expanded, plain-end pipe 104 is shorter than unexpanded plain-end pipe (100 in FIG. 2A) (note that the extent of the shortening is exaggerated in FIG. 2B for clarity), and the wall thickness 104C of the expanded pipe 104 is generally less than the wall thickness of the unexpanded pipe (100C in FIG. 2A). Ends 105, 106 of the expanded, plain-end pipe 104 show deformations characteristic of casing and tubing which has been expanded by a conically-tapered cold-forming "pig," such as the expansion tool (101 in FIG. 2A) shown in FIG. 2A. Expanded first end 105 shows radial "belling-out" at the end of the pipe and an axial "wrinkling" or "rippling" proximate a pipe section near the end. Expanded second end 106 shows a radial "belling-in" proximate the end. Note that the radial displacements of the pipe wall are exaggerated for clarity.

Figure 3A:
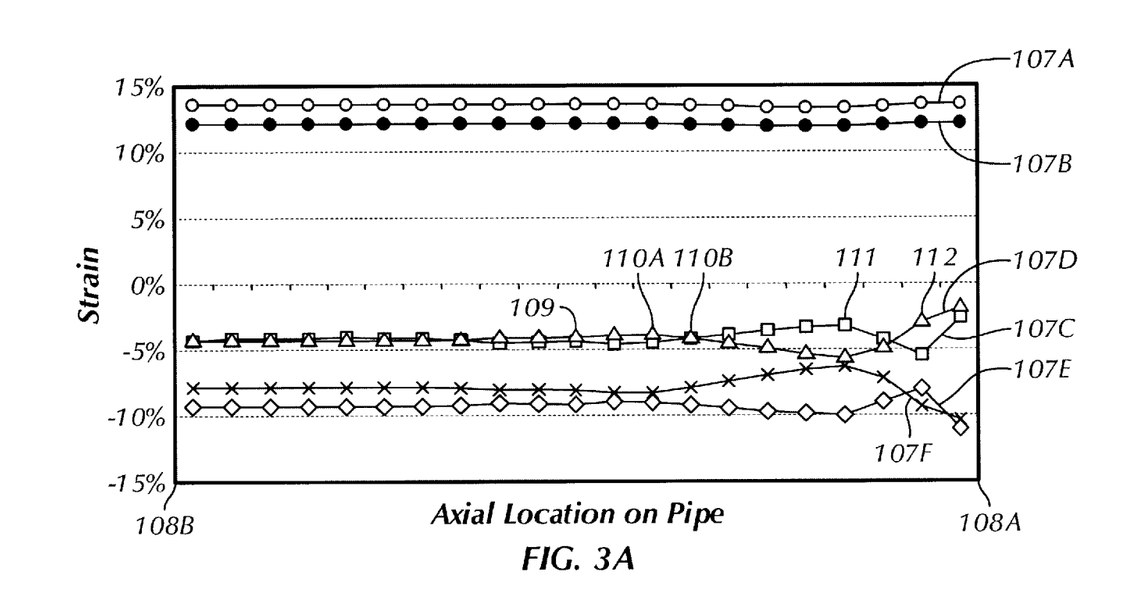
FIG. 3A shows a graph of strains along the length of the radially-expanded pipe shown in FIG. 2B proximate a first expanded end.

FIG. 3A shows a plot of strains in the expanded plain-end pipe (104 in FIG. 2B) along the length of the pipe (104 in FIG. 2B) proximate the first expanded end (105 in FIG. 2B). The strains at first expanded end (105 in FIG. 2B) are shown at chart end 108A, while the strains proximate the pipe body are shown toward chart end 108B. Note that FIG. 3B shows a cross-sectional view of the pipe that may be viewed as a physical corollary to the plots shown in FIG. 3A.

In FIG. 3A, strains at the expanded ID (104A in FIG. 3B) are shown as an ID hoop strain curve 107A, an ID axial strain curve 107C, and an ID radial strain curve 107E. Strains at the expanded outer diameter (104B in FIG. 3B) are shown as an OD hoop strain curve 107B, an OD axial strain curve 107D, and an OD radial strain curve 107F. Note that the axial strains (107A and 107B) and radial strains (107E and 107F) are substantially constant and negative in the pipe body, as shown near chart end 108B, confirming that the pipe (104 in FIG. 3B), as expected, becomes shorter and has a reduced wall thickness as it is expanded by the expansion tool (101 in FIG. 2B).

Proximate inflection point 109, the OD axial strain 107D and the ID axial strain 107C diverge, wherein the OD axial strain 107D increases (e.g., becomes less negative) and the ID axial strain 107C decreases (e.g., becomes increasingly negative), indicating that the pipe (104 in FIG. 3B) is beginning to "bulge" in a radially outward direction. At inflection point 110A, the OD axial strain 107D begins to decrease, while ID axial strain 107C begins to increase, thereby indicating that the pipe (104 in FIG. 3B) is contracting in a radially inward direction. At inflection point 110B, the axial strain curves 107C, 107D intersect. At inflection point 111, the pipe (104 in FIG. 3B) begins outward radial expansion and, at inflection point 112, the ID axial strain 107C begins to decrease while the OD axial strain 107D continues to increase (e.g., a rate of radial expansion decreases proximate the end (105 in FIG. 3B) of the pipe (104 in FIG. 3B)).

Figure 3B:
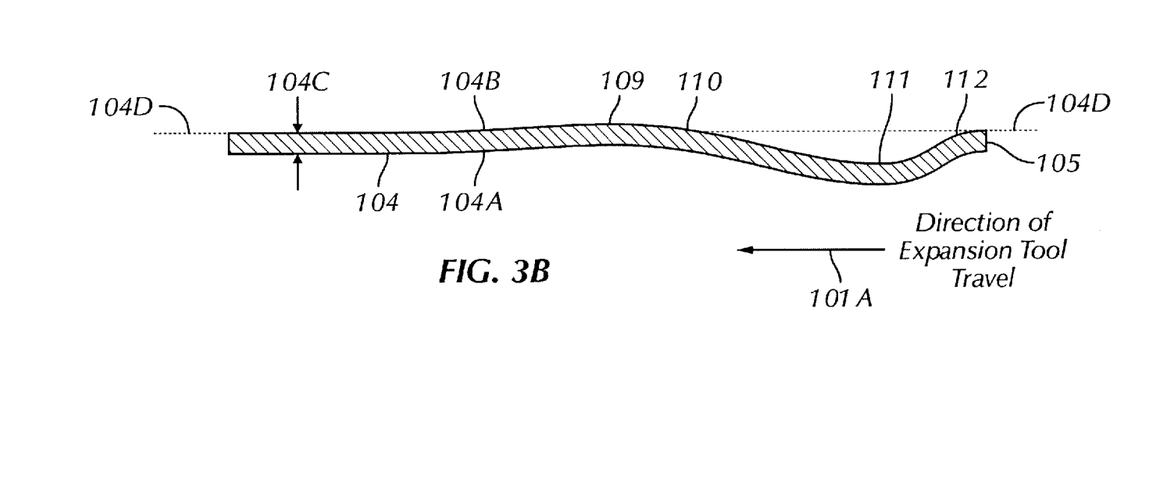
FIG. 3B shows a cross-sectional view of the radially-expanded pipe shown in FIG. 2B.

Referring to FIG. 3B, a nominal expanded outer diameter 104D of the expanded pipe 104 is shown as a reference for the radial displacements of the pipe 104 at the inflection points 109, 111A, 110B, 111, 112. Note that radial displacements of the pipe wall are slightly exaggerated for clarity. Note that a maximum displacement occurs at inflection point 111 and that a wall thickness 104C is slightly decreased proximate the end 105 of the pipe 104.

The "wrinkles" or "ripples" proximate the end of the pipe resemble, for example, a heavily-damped sinusoidal function. Based on a Finite Element Analysis (FEA) and physical experimentation with the expansion process, it is believed that the amplitude, period, and damping of the "ripples" depend on the total plastic expansion required in the pipe, the diameter-to-wall thickness ratio (d/t), the design of the expansion tool (particularly the taper angle), and a coefficient of friction between the expansion tool and the unexpanded pipe.

Figure 4A:
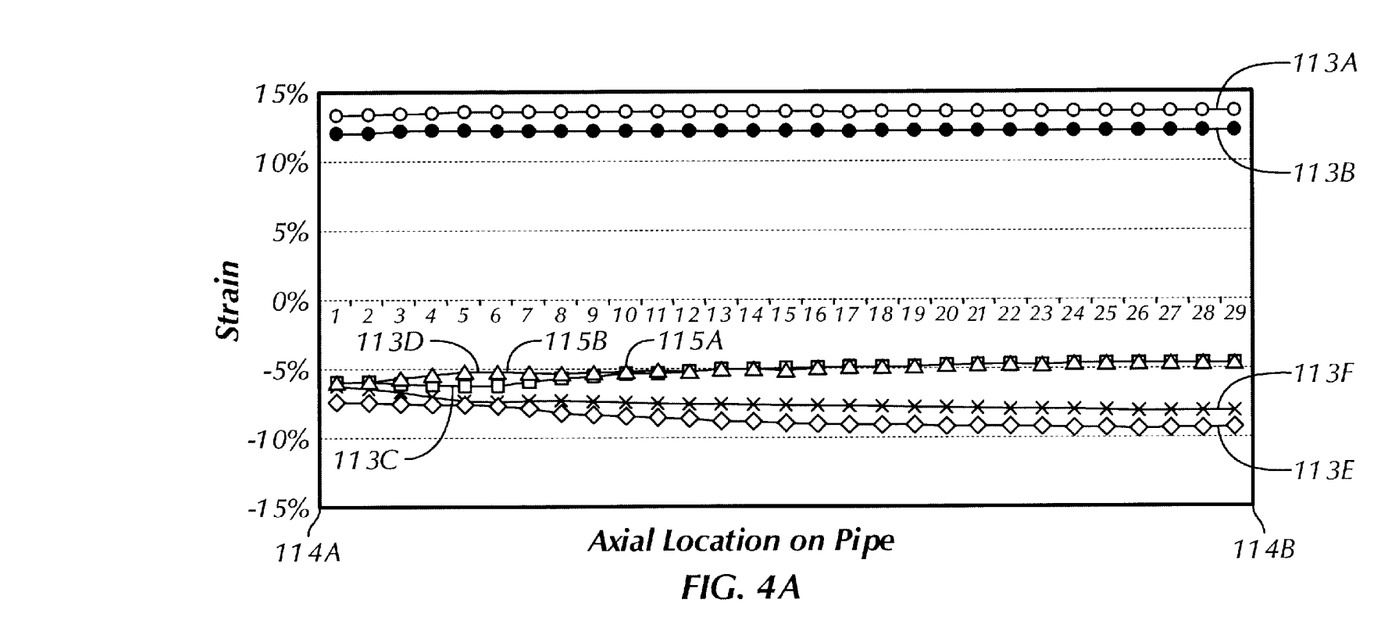
FIG. 4A shows a graph of strains along the length of the radially-expanded pipe shown in FIG. 2B proximate a second expanded end.

FIG. 4A shows a plot of strains in the pipe 104 along the length of the pipe proximate the second expanded end 106. The strains at the second expanded end 106 are shown at chart end 114A, while the strains toward the pipe body are shown toward chart end 114B. Note that FIG. 4B shows a cross-sectional view of the pipe that may be viewed as a physical corollary to the plots shown in FIG. 4A.

Strains at an expanded inner diameter (ID) 104A are shown as an ID hoop strain curve 113A, an ID axial strain curve 113C, and an ID radial strain curve 113E. Strains at an expanded outer diameter (OD) 104B are shown as an OD hoop strain curve 113B, an OD axial strain curve 113D, and an OD radial strain curve 113F. Note that the axial strains (113A and 113B) and the radial strains (113E and 113F) are substantially constant and negative in the pipe body, as shown near chart end 114B, confirming that the pipe (104 in FIG. 4B), as expected, becomes shorter and has a reduced wall thickness as it is expanded by the expansion tool (101 in FIG. 2A). Also note that strain levels in the body of the pipe (104 in FIG. 4B) (e.g., strain values at chart end 114B) shown in FIG. 4A correspond to strain levels in the body of the pipe shown in FIG. 3A (e.g., strain levels at chart end 108B).

Referring to FIG. 4A, at inflection point 115A, the OD axial strain curve 113D is increasing while the ID axial strain curve 113C is decreasing, indicating that the pipe (104 in FIG. 4B) is beginning to bulge radially outward. At inflection point 115B, the OD axial strain curve 113D is decreasing while the ID axial strain curve 113C is increasing, indicating that the pipe (104 in FIG. 4B) is belling radially inward. Note that the "inward belling" trend continues all the way to the second expanded end (106 in FIG. 4B), represented at chart end 114A.

Figure 4B:
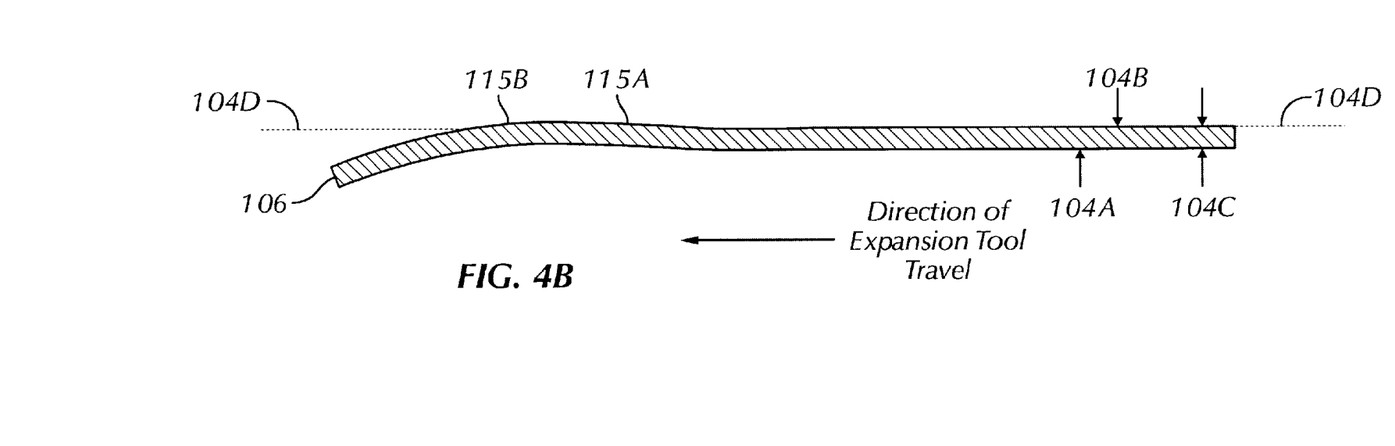
FIG. 4B shows a cross-sectional view of the radially-expanded pipe shown in FIG. 2B.

FIG. 4B shows a nominal outer diameter 104D of the expanded pipe body as a reference for radial displacements of the pipe 104 at the inflection points 115A, 115B. Note that radial displacements of the pipe wall are slightly exaggerated for clarity and that a wall thickness 104C remains substantially constant. At inflection point 115A, there is the predicted outward belling of the pipe. As discussed with respect to FIG. 4A above, the pipe 104 begins inward radial belling at inflection point 115B and continues to bell radially from the inflection point 115A to the second expanded end 106.

Radial Plastic Expansion of Threaded Tubing Joints

When designing threaded connections for radially expandable tubing or casing joints, it is important to compensate for the aforementioned axial and radial displacements that occur in the tubing joints proximate the threaded connections. Accordingly, embodiments of the invention are designed to "focus" and/or compensate for the axial and radial displacements proximate ends of threaded pipe joints, casing joints, and tubing joints after radial plastic expansion thereof. In some embodiments, selectively placed strain-focusing grooves are used to maintain the integrity of the threaded connections after radial plastic expansion thereof.

It has been determined from experimentation that when a length of pipe comprising made-up vee-type or square-shouldered threaded connections (such as API "round" or "buttress" threads) is radially plastically expanded, plastic deformation of the made-up connections results in axial and radial displacements that are similar to the aforementioned axial and radial displacements experienced during radial plastic expansion of plain-end pipe because the threads do not provide significant resistance to relative radial deformation of the pin and box members. For example, when a radial expansion tool is moved in an axially upward direction through a typical string of casing (which is usually run into a wellbore with the pin connection ends pointed down ("pin-down")), a pin end of a made-up connection comprising API buttress threads would be deformed in a manner similar to the expanded first end (105 in FIG. 2B) shown in FIG. 2B, while a box end would be deformed in a manner similar to the expanded second end (106 in FIG. 2B) shown in FIG. 2B. Because the pin and box ends (in this example comprising API buttress threads) are radially unrestrained with respect to each other, the box end will generally radially "bell-out" and the pin end will generally radially "bell-in" as described in detail above.

However, it has been determined through experimentation and Finite Element Analysis (FEA) that if the threaded connection resists radial deformation, as in the case when generally dovetail-shaped (e.g., "wedge") threads are used to form the threaded connection, then unsupported ends (e.g., portions of the threaded connection extending past the last engaged thread) of both the box and pin connections will generally radially bell inward in a fashion similar to the expanded second end (106 in FIG. 2B) shown in FIG. 2B. Accordingly, an external metal-to-metal seal (e.g., a seal formed between the pin connection and the box connection proximate an outer shoulder formed by the end of the box connection) can be formed with a generally dovetail-shaped thread form because of increased contact stresses between the box end and a pin shoulder proximate the box end generated when the box end bells radially inward after radial plastic expansion thereof. However, an internal metal-to-metal seal (e.g., a seal formed proximate a pin nose on the pin connection) is difficult to maintain, even with a generally dovetail-shaped thread, because the pin nose end tends to bell inward (away from the box connection) after radial plastic expansion thereof.

Accordingly, "strain focusing grooves" used in various embodiments of the present invention are adapted to "focus" and/or control strains generated by radial plastic expansion of a threaded connection so as to produce a controlled differential rate of radial expansion in a region proximate the metal-to-metal seal. By focusing and controlling the strains in the threaded connection during radial plastic expansion, a rate of radial expansion within the groove can be adjusted relative to a rate of radial expansion outside the groove. The differential rate of expansion helps form a threaded connection that exhibits markedly different radial expansion properties than, for example, ordinary plain end pipe, thereby allowing control of plastic displacements within the connection. Note the terms "strain focusing groove" or "groove," as used herein, refer to a plurality of different grooves adapted to allow control of plastic displacements of threaded and/or threaded connections during radial expansion thereof.

U.S. Pat. No. 5,423,579, issued to Blose at el., and assigned to the assignee of the present invention and incorporated by reference herein in its entirety, discloses a metal-to-metal seal design for threaded tubular connections.

To form a reliable metal-to-metal seal, the pin and box connections generally contact each other so as to form a thin, cylindrical contact area (which may be achieved by, for example, using mismatched angles on corresponding pin and box elements), and the connection must generally be tightened so as to form a selected minimum contact stress at the seal contact area (e.g., so as to seal against internal and/or external pressure). Accordingly, in order to form a reliable metal-to-metal seal proximate threaded connections disposed on radially plastically expanded casing strings and the like in accordance with embodiments of the invention, the connection should be designed so as to "focus" or compensate for residual expansion stresses proximate the ends of the casing string to form a sufficient contact stress at the seal contact area after radial plastic expansion.

In embodiments of the invention described herein, threads used to form threaded connection are preferentially "wedge" threads comprising generally dovetail-shaped threads with converging thread widths. Wedge threads are known in the art and are disclosed in, for example, U.S. Pat. No. RE30,647 issued to Blose, U.S. Pat. No. RE34,467 issued to Reeves, U.S. Pat. No. 4,703,954 issued to Ortloff et al., and U.S. Pat. No. 5,454,605 issued to Mott, all assigned to the assignee of the present invention. Wedge threads used in the embodiments of the invention comprise generally dovetail-shaped threads in which, for example, a crest of a thread is wider than a root of the thread and wherein two thread flanks comprise different but constant leads. A width of the wedge thread form generally changes along the length of the thread (e.g., along a helical thread form) so that, as the connection is "made-up" (screwed together), thread flanks formed on connecting pin and box members get closer together. Moreover, some embodiments of the invention may comprise wedge thread forms in which both flanks have a corresponding negative angle (with respect to an the axis of the tubular member on which they are formed), in which one flank has a negative angle and one flank has a positive angle, and the like as long as a crest of the thread form is generally wider than a root of the thread form.

Wedge threads are preferred for use in some embodiments of the invention because, for example, they do not require separate torque shoulders. They do not require separate torque shoulders because converging load and stab flanks disposed on the wedge threads react against one another at make-up. Moreover, the generally dovetail-shape of the thread form provides resistance to radial separation of the box and pin during radial plastic expansion of the connection.

Note that wedge threads are also preferable for use with radially plastically expandable casing strings and the like because traditional "shouldered" threaded connections may experience severe wear and/or disintegration of the shoulders because axial shrinkage of the casing string (e.g., due to "Poissoning") during radial expansion may raise the contact stresses at the shoulders beyond an ultimate compressive strength of a material from which the casing string is formed. However, for moderate radial expansion (e.g., for substantially less than 10% expansion), a shouldered connection comprising generally dovetail-shaped threads may provide adequate resistance to radial separation of the connection during expansion and a sufficient contact stress at the shoulder. It will be appreciated by those skilled in the art that a "semi-dovetailed" thread form (e.g., a thread form wherein one of the thread flanks is at an approximately 90 degree angle with respect to the pipe axis) may also provide resistance to radial separation of the connection during expansion. Accordingly, the invention is not intended to be limited by embodiments described herein that include a "fully dovetailed" thread form.

Figure 5A:
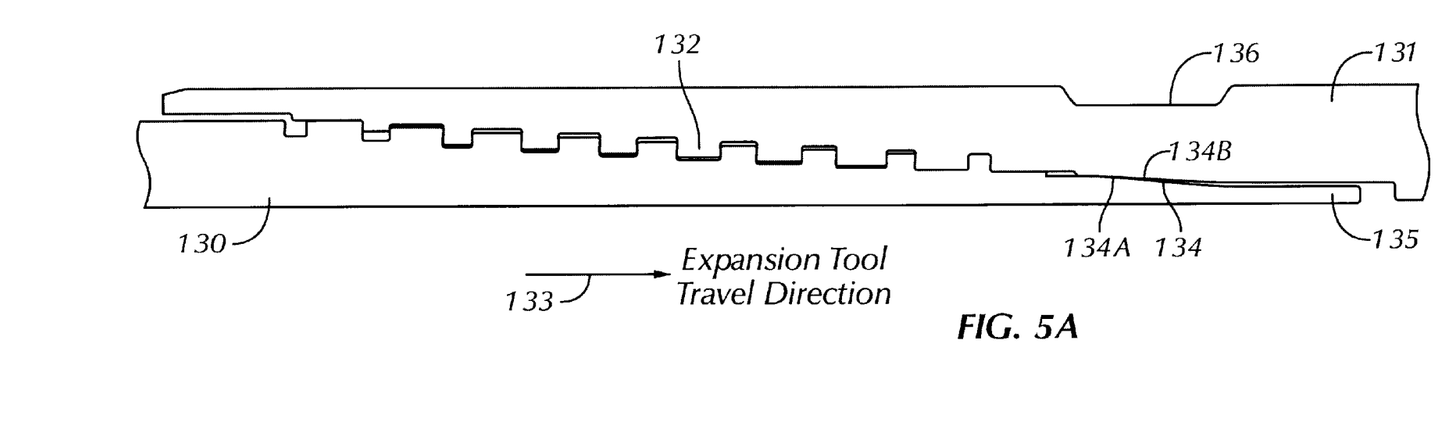
FIG. 5A shows a cross-sectional view of an embodiment of the invention in an unexpanded condition.

FIG. 5A shows an embodiment of the invention in a substantially unexpanded state. The connection comprises a pin member 130 and a box member 131, each of which having wedge threads 132 formed thereon. Moreover, the pin member 130 and the box member 131 comprise corresponding adjacent seal surfaces 134A, 134B, respectively, adapted to form a metal-to-metal seal 134 upon make-up of the connection. Because the wedge threads 132 are generally dovetail-shaped, the wedge threads 132 help prevent the pin member 130 and the box member 131 from deforming radially relative to one another after radial plastic expansion. A direction of travel 133 of an expansion tool (not shown) used to radially plastically expand the connection, in view of the discussion above, determines that the pin connection 130 will behave like the second expanded end of plain end pipe (106 in FIG. 3A) in a region of the seal 134 defined by contact between adjacent seal surfaces 134A, 134B (e.g., a distal end 135 of the pin 130 will tend to bell inwards after radial plastic expansion thereof). In this embodiment, a circumferential strain focusing groove 136 is formed in an outer surface of the box 131, and the groove 136 is adapted to focus and/or localize expansion stresses, experienced during radial plastic expansion. In this embodiment, the circumferential strain focusing groove 136 comprises substantially tapered shoulders. Note that in this embodiment, a metal-to-metal seal may be formed by contact between the adjacent seal surfaces 134A, 134B if a sufficient amount of radial interference is established proximate the seal 134 during make-up of the connection. Moreover, other embodiments of the invention may comprise more than one groove formed in the box member. As used herein, the term "circumferential" with respect to a groove (e.g., with respect to a strain focusing groove) indicates that the groove is generally formed about a perimeter of the box or pin member.

Figure 5B:
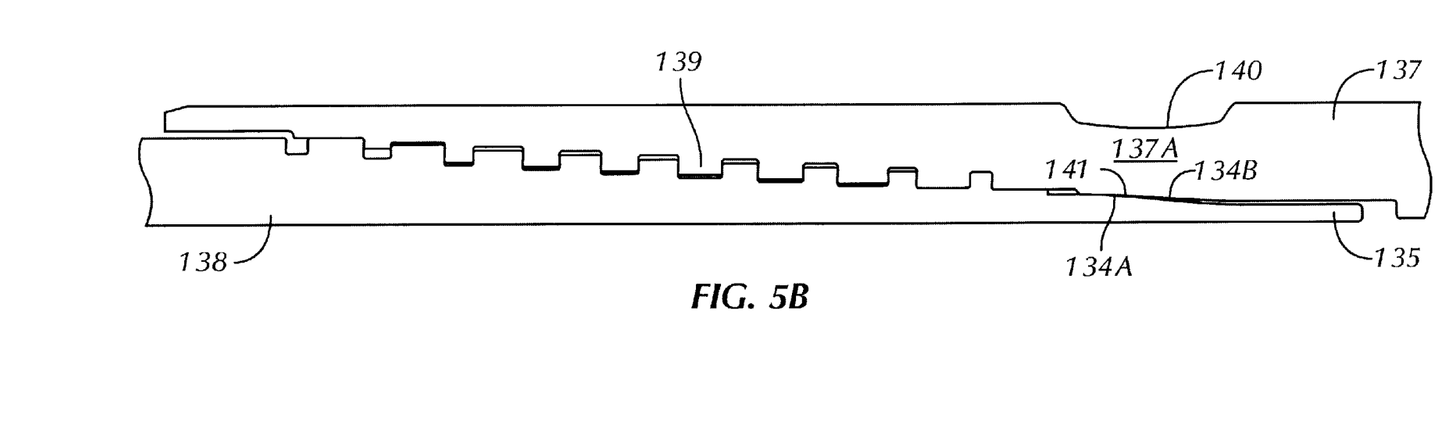
FIG. 5B shows a cross-sectional view of an embodiment of the invention in an expanded condition.

FIG. 5B shows a cross-sectional view of the connection shown in FIG. 5A after radial plastic expansion thereof. Because an expanded box member 137 is restrained from moving away from an expanded pin member 138 by expanded wedge threads 139, the box connection 137 in the region of an expanded groove 140 will behave as if that region were positioned proximate a middle of a pipe body (e.g., a middle of the pipe body on which the connection is formed). As a result, a thinned section 137A disposed in a region under the groove 140 will typically be less able to resist residual hoop stresses present in the members after radial plastic expansion, and the box member will "bow-in" proximate the thinned region 137A. Flexure proximate the thinned region 137A maintains a substantially cylindrical contact area 141 at a point where the box member 137 (proximate the thinned region 137A) contacts the expanded pin member 138.

Figure 5C:
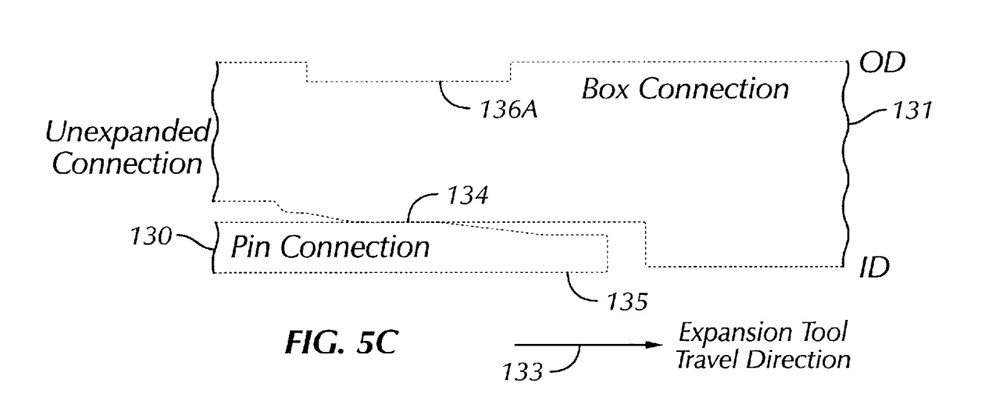
FIG. 5C shows an embodiment of the invention in an unexpanded condition.
Figure 5D:
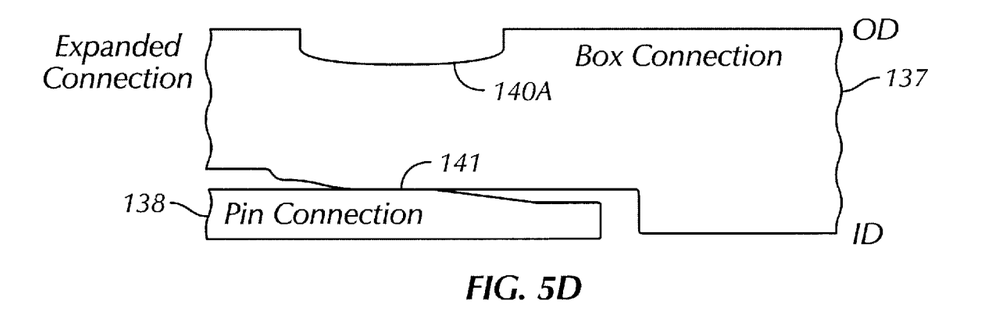
FIG. 5D shows an embodiment of the invention in an expanded condition.

FIG. 5C shows an embodiment of the invention that is similar to the embodiment shown in FIG. 5A except that an unexpanded strain focusing groove 136A comprises substantially square shoulders. FIG. 5D shows a radially plastically expanded connection corresponding to the unexpanded connection shown in FIG. 5C. An expanded strain focusing groove 140A comprises substantially square shoulders, and contact stresses proximate a substantially cylindrical contact area 141 are generally greater when the connection in an expanded condition. Note that in other embodiments, the seal groove may comprise different cross-sections that those shown in FIGS. 5A–5D. For example, the groove may comprise a substantially hemispherical cross-section. Accordingly, the geometry of the strain focusing groove may be modified within the scope of the invention, and the invention is not intended to be limited to the embodiments shown above.

Figure 6A:
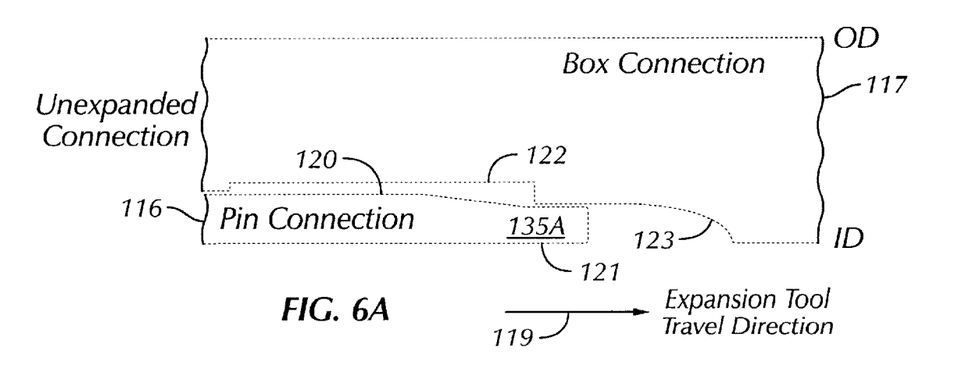
FIG. 6A shows an embodiment of the invention in an unexpanded condition.

FIG. 6A shows a cross-sectional view of a preferred embodiment of the invention in an unexpanded state. A made-up threaded connection comprises wedge threads 118 formed on an unexpanded pin member 116 and an unexpanded box member 117. The wedge threads 118 help prevent the pin member 116 and box member 117 from excessive radial deformation relative to one another during radial expansion of the connection. A direction of travel 119 of an expansion tool (which may represent an axially upward traverse of a pig moving through a pin-down casing string disposed in a wellbore) determines that a distal end 135A of the pin 121 will tend to bell inward proximate a region of a seal surface 120 so that the pin member 116 behaves in a manner similar to the expanded second end (106 in FIG. 3A) of the plain end pipe shown in FIG. 3A. A strain focusing groove 122 is formed in an inner surface 123 of the box member 117 and is adapted to localize expansion stresses (generated during radial plastic expansion of the connection) within the groove 122. Note that a seal is not typically formed internally between the pin member 121 and the box member 117 (e.g., no internal metal-to-metal seal is formed proximate the seal surface 120 prior to expansion).

Figure 6B:
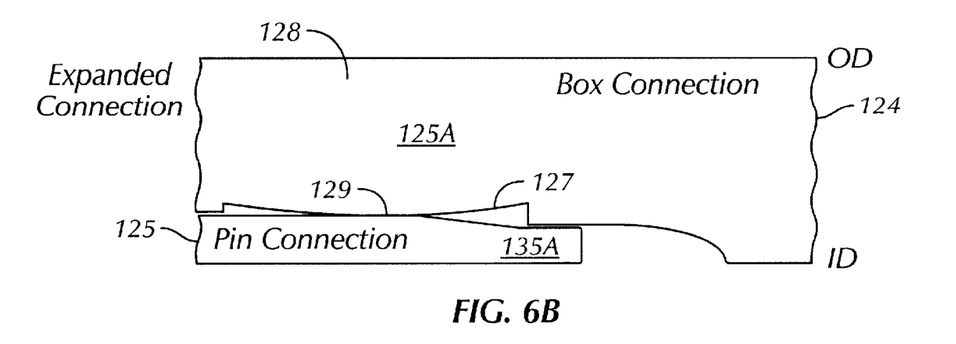
FIG. 6B shows an embodiment of the invention in an expanded condition.

FIG. 6B shows a cross-sectional view of the connection shown in FIG. 6A after radial plastic expansion thereof. Because an expanded box member 124 is restrained from moving away from an expanded pin member 125 by expanded wedge threads 126, the box member 124 in the region of an expanded strain focusing groove 127 will behave as if that region were positioned proximate a middle of a pipe body (e.g., a middle of the pipe body on which the connection is formed). As a result, a thinned section 124A will be less able to resist residual hoop stresses present in the box member 124 proximate the groove 127 and will "bow-in" proximate the thinned region 124A. Flexure proximate the thinned region 124A maintains a substantially cylindrical contact area 129 at a point where the box member 124 (proximate the thinned region 124A) contacts the expanded pin member 125.

The threaded connection shown in FIGS. 6A and 6B is advantageous because the seal groove (122 in FIG. 6A) is formed on the inner surface of the box member so that there are no exposed edges on either an inner surface or an outer surface of the made-up connection. However, as described above, this embodiment does not generally form an internal metal-to-metal seal in the connection in the unexpanded state (such as the metal-to-metal internal seals shown in the connections of FIGS. 5A–5D).

Figure 7:
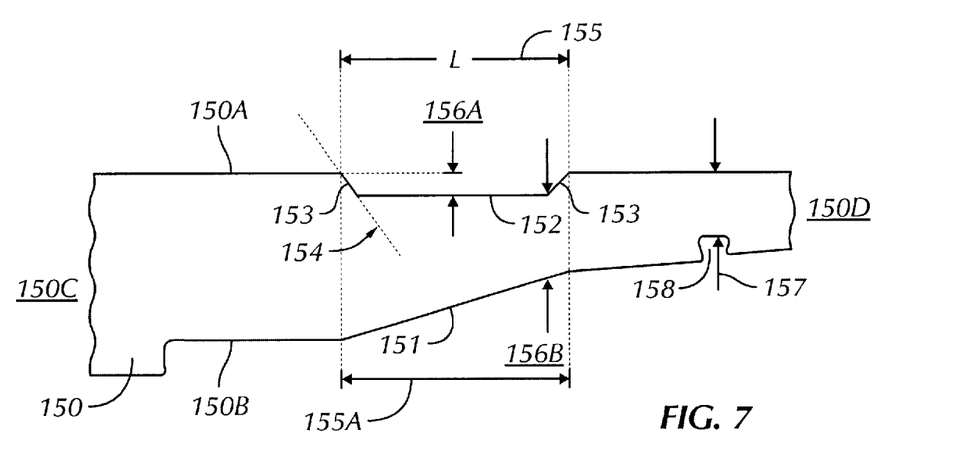
FIG. 7 shows a cross-sectional view of an embodiment of the invention.

FIG. 7 shows a cross-section of a box member of an embodiment of the invention comprising a circumferential strain focusing groove 152 formed on an outer surface of a box member 150. The following description relates to selection of dimensional properties used to design and position the strain focusing groove 152. The box member 150 includes an outer surface 150A, an inner surface 150B, a pipe body end 150C, a box nose end 150D, a metal-to-metal seal surface 151, and the groove 152.

The groove 152 comprises groove shoulders 153 formed at a shoulder angle 154 with respect to the outer surface 150A. It has been determined through experimentation and Finite Element Analysis (FEA) that it is advantageous for the shoulder angle 154 to be the same for both groove shoulders 153 (e.g., for the groove 152 to be substantially symmetric), and that, in some embodiments, the shoulder angle 154 should be between about 30 degrees and about 45 degrees. In these embodiments, the shoulder angle 154 being within the referenced range optimizes deformation of a seal surface 151, thereby minimizing potentially harmful stress concentrations in a region proximate the groove 152. The groove 152 has an overall groove width 155. It has been determined through experimentation and FEA that the overall groove length 155 should be approximately the same as an axial width 155A of the seal surface 151. Moreover, in some embodiments, the groove 152 should be axially positioned proximate the seal surface 151.

A maximum desirable depth 156A of the groove 152 in some embodiments may be determined by calculating a minimum cross sectional area 156 of the box member 150 proximate the groove 152. Experimentation and FEA have determined that the minimum cross-sectional area 156 should be between about 1.10 to 1.25 times a critical section area 157 of the box member 150 (as measured, in this embodiment, between a thread root and the box OD 150A proximate a thinnest portion of the box member 150 near a first engaged thread 158). It will be appreciated by those skilled in the art that, while the critical section area 157 of the box member 150 is shown proximate the root of the first engaged thread 158 of the box member 150 in this example, the location of the critical section area of the connection may vary from one threaded connection design to another. For example, the critical section area of the connection could be disposed on a corresponding pin member (not shown in FIG. 7). In general, the critical section area may be defined as a minimum cross-sectional area of the connection (located either on the pin member or on the box member) required to withstand a selected make-up torque (e.g., a selected make-up stress applied to the connection. The critical section area may be calculated by and its location determined by means known in the art (such as, for example, API Specification 5C3, published by the American Petroleum Institute, Washington, D.C.).

Figure 8:
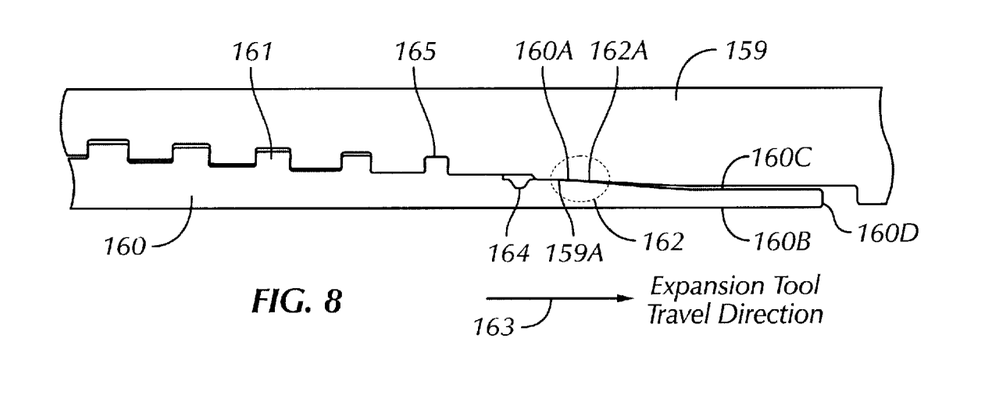
FIG. 8 shows a cross-sectional view of an embodiment of the invention.

FIG. 8 shows a cross-sectional view of an unexpanded, made-up connection in accordance with an embodiment of the invention. The connection comprises a box member 159 and a pin member 160, each having wedge threads 161 formed thereon. A substantially cylindrical contact area 162A (comprising stresses normal to adjacent seal surfaces 159A, 160A formed on the box member 159 and the pin member 160, respectively) forms a pressure-energized metal-to-metal seal 162 after make-up of the threaded connection.

The pin member 160 includes a pin nose 160D formed thereon, an inner surface 160B, an outer surface 160C, and a first engaged thread 165. An expansion tool (or "pig") is generally axially displaced through the connection in a travel direction 163. Because of a circumferential strain focusing groove 164 formed on the pin member 160, the unsupported pin nose 160D will generally not deform, after radial plastic expansion thereof, in a manner similar to the second expanded end (106 in FIG. 2B) of the plain end pipe shown in FIG. 2B. For example, the groove 164 helps prevent the pin nose 160D from belling radially inward toward the inner surface 160B, and thereby "unloading the seal" (e.g., eliminating contact stresses that form a metal-to-metal seal 162) after radial plastic expansion of the connection.

In this embodiment of the invention, the groove 164 is formed proximate the outer surface 160C of the pin nose 160D between the first engaged thread 165 and the metal-to-metal seal surface 162. This point (e.g., the location of the groove 164) is roughly analogous to an axial position (e.g., along a length of pipe or a casing string) of the inflection point (115A in FIG. 4B) on the second expanded end (106 in FIG. 4B) of the radially plastically expanded plain-end pipe shown in FIG. 4B. At this axial position along the length of the pipe and/or casing string comprising the threaded connection (without the strain focusing groove), post-expansion axial strains proximate an outer surface of the pipe begin to increase with respect to post expansion axial strain proximate an inner surface (e.g., the pipe begins to bell radially inward as described previously with respect to FIG. 4B).

The groove 164 helps equalize axial strains proximate the outer surface 160C of the pin nose 160D and axial strains proximate the inner surface 160B of the pin nose 160D so that the pin nose 160D does not bell radially inwardly after radial plastic expansion thereof. Accordingly, the groove 164 helps ensure that sufficient contact stress is maintained proximate the metal-to-metal seal surfaces 159A, 160A so as to seal against both internal and external pressures acting on the radially plastically expanded threaded connection. Note that other embodiments of the invention may comprise, for example, more than one groove so that the invention is not intended to be limited to the single groove described above. In these embodiments, the circumferential grooves may be formed on the pin member and may be axially spaced between the first engaged thread and the metal-to-metal seal surfaces.

Figure 9:
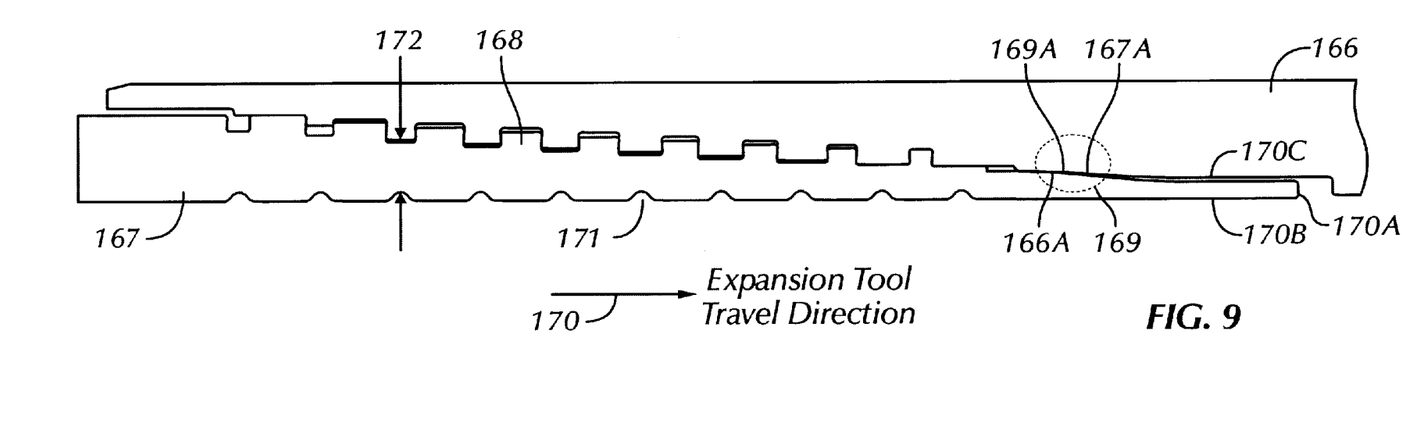
FIG. 9 shows a cross-sectional view of an embodiment of the invention.

FIG. 9 shows a cross-sectional view of an unexpanded, made-up connection according to an embodiment of the present invention. The threaded connection comprises a box member 166 and a pin member 167, each having wedge threads 168 formed thereon. A substantially cylindrical contact area 169 comprising contact stresses formed substantially normal to opposing seal surfaces 166A, 167A formed on the box member 166 and the pin member 167, respectively. The contact between the opposing surfaces 166A, 167A and the substantially normal stresses proximate the substantially cylindrical contact area 169 form a metal-to-metal seal 169A after the threaded connection is made-up.

The pin member 167 comprises a pin nose 170A, an inner surface 170B, and an outer surface 170C. A radial expansion tool will generally be axially displaced through the threaded connection in a travel direction 170. In this embodiment, a groove 171 is helically formed on the inner surface 170B of the pin member 167. The groove 171 is roughly axially positioned along the pin member 167 under roots of the wedge threads 168 formed on the pin member 167. Note that, because of the direction of travel 170 of the radial expansion tool, the pin member 167 will radially plastically expand in a manner similar to the radial expansion of the second expanded end (106 in FIG. 4B) in the expanded plain-end pipe shown in FIG. 4B. Accordingly, the pin member 167 will typically bell radially inward after radial plastic expansion thereof.

The groove 171 in this embodiment is designed to control axial strains formed by radial plastic expansion of the connection (e.g., proximate the inner surface 170B of the pin member 167). The groove 171 essentially causes axial strain (113C in FIG. 4A) proximate the inner surface 170B to become "more positive," thereby reducing an amount by which the pin member 167 displaces radially inwardly. This embodiment is advantageous because the groove 171 helps reduce hoop stresses formed proximate the wedge threads 168, thereby reducing a tendency of the wedge threads 168 to "jump-out" or separate because of the loading generated by radial plastic expansion of the threaded connection.

Note that the groove may be smaller than the groove 171 shown in FIG. 9. The groove 171 in FIG. 9 is exaggerated for clarity. In some embodiments of the invention, the groove 171 is positioned proximate the roots of the wedge threads 168 (e.g., formed in a helical arrangement that substantially "tracks" the thread form). Further, a critical section area 172 of the pin member 167 may be affected by the presence of the groove 171 so that the groove 171 may be adapted accordingly so as to prevent weakening of the connection. For example, a depth of the groove 171 may be varied along the length of the pin member 167 so that the groove 171 is shallower proximate the pin nose 170A (e.g., proximate the thinnest section of the pin member 167) or otherwise adapted to help ensure that the critical section area 172 is not reduced below a predetermined level.

Moreover, in other embodiments, a series of circumferential grooves may be used to form the strain focusing groove instead the single helical groove 171 shown in FIG. 9. For example, instead of a single helical groove that substantially tracks the root of the thread formed on the pin member, a plurality of individual circumferential grooves may be axially spaced along the inner surface of the pin member (e.g., wherein the grooves are axially spaced one thread-width apart). Other embodiments may comprise a groove having a different cross-section than the substantially tapered cross-section shown in FIG. 9. For example, the groove cross-section may be substantially hemispherical, substantially square, etc. Accordingly, the specific exemplary embodiments shown herein are not intended to limit the scope of the invention.

Figure 10:
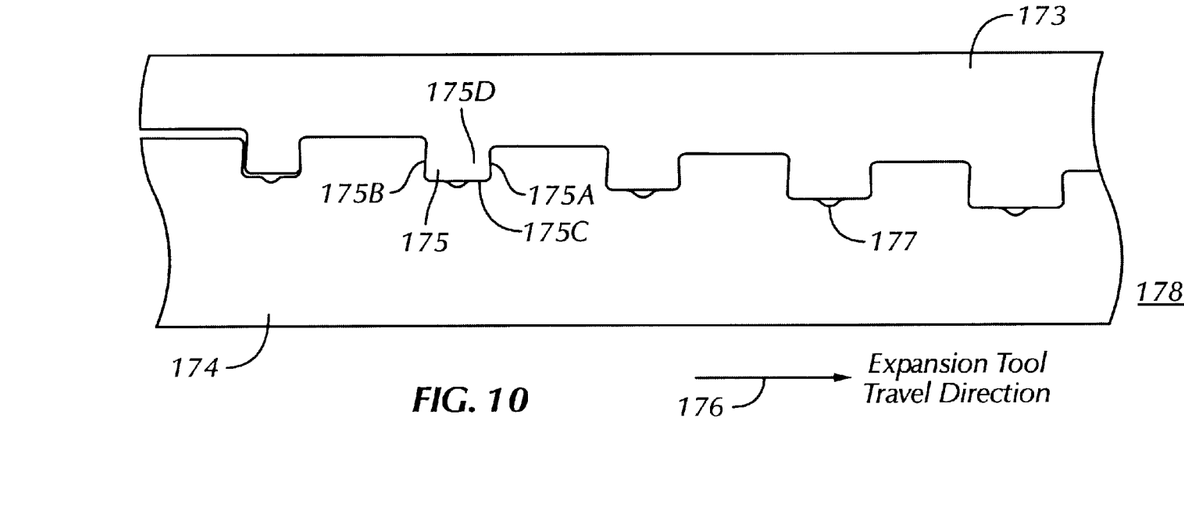
FIG. 10 shows a cross-sectional view of an embodiment of the invention.

FIG. 10 shows a cross-sectional view of a threaded region of an unexpanded, made-up connection in accordance with an embodiment of the invention. The connection comprises a box member 173 and a pin member 174, each having wedge threads 175 formed thereon. The wedge threads 175 comprise stab flanks 175A, load flanks 175B, and roots 175C and 175D of corresponding female and male thread forms, respectively. An expansion tool may generally be axially displaced through the connection in an expansion tool travel direction 176 during radial plastic expansion of the connection.

This embodiment of the invention includes a thread root groove 177 formed helically proximate the root of the female thread form 175C on the pin member 174. While other embodiments of the current invention are adapted to control larger displacements of a radially plastically expanded connection (formed on, for example, a casing string) so as to form or maintain a metal-to-metal seal, this embodiment adapted to control relatively "small scale" displacements that occur proximate the region of the threaded connection.

For example, when an expandable tubular connection is radially plastically expanded, a thread form may "comb-out" such that the threads in the connection may separate (e.g., threads on the pin member may separate from threads on the box member during radial expansion of the threaded connection). Because the pin member 174 typically bells radially inward proximate a pin nose 178 during radial plastic expansion of the threaded connection, the load flank 175B and stab flank 175A of the female thread form (which both have nominal negative flank angles and form a generally dovetail shaped thread) will tend to "open-up" so that the flank angles become less negative.

Depending on the exact design of the thread form, an amount of radial deformation of the thread form, and a method of expansion (e.g., a shape of an expansion tool, direction of travel of the expansion tool, etc.), the less negative flank angles will typically result in a reduction of load-carrying capacity of the thread form and localized stress concentrations in the threads. However, the thread root groove 177 is adapted to reduce, control, or otherwise focus expansion strains in the region proximate the thread roots (on the pin member 174) so as to minimize post-expansion distortion of the thread form. For example, the thread root groove 177 may be adapted to reduce an amount by which the threads open-up, thereby maintaining the negative flank angles and the load carrying capacity of the threads.

Those skilled in the art will appreciate that two or more of the embodiments described above may be combined so as to achieve a desired effect in controlling distortions in radially plastically expandable tubular connections. For example, in some embodiments, a threaded connection may comprise a strain focusing groove (136 in FIG. 5A) formed on an outer surface of a box member (adapted to form a metal-to-metal seal between adjacent contact surfaces formed on inner surfaces of the pin member and box member, respectively, after radial plastic expansion of the connection), a groove (164 in FIG. 8) formed on an outer surface of a pin member (adapted to maintain a selected contact stress proximate the metal-to-metal seal), and a thread root groove (177 in FIG. 10) (adapted to ensure a load-carrying integrity of the threads). Moreover, embodiments may comprise standard (e.g., API or square) thread forms in combination with aspects described above. Other embodiments may comprise different combinations, and the scope of the invention is not intended to be limited to the exemplary embodiments shown herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A radially expandable tubular connection comprising:
   a box member comprising an internal thread and a first seal surface;
   a pin member comprising an external thread and a second seal surface, the external thread adapted to threadedly engage the internal thread and the first and second seal surfaces adapted to form a metal-to-metal seal upon engagement thereof; and
   at least one groove formed on an outer surface of the box member, the at least one groove shaped so that the box member radially deforms in a direction toward the pin member axially proximate the metal-to-metal seal upon radial plastic expansion of the pin and box members after engagement of the threads.

2. The tubular connection of claim 1, wherein the internal thread and the external thread comprise substantially dovetail-shaped threads.

3. The tubular connection of claim 1, wherein the at least one groove is axially positioned along the box member proximate a location of the metal-to-metal seal.

4. The tubular connection of claim 1, wherein the first and second seal surfaces are adapted to form a substantially cylindrical, contact region upon radial expansion of the pin and box members.

5. The tubular connection of claim 1, wherein a width of the at least one groove is approximately equal to a length of the seal surfaces.

6. The tubular connection of claim 1, wherein the at least one groove comprises a substantially rectangular cross-section.

7. The tubular connection of claim 1, wherein the at least one groove comprises a substantially hemispherical cross-section.

8. The tubular connection of claim 1, wherein shoulders of the at least one groove are substantially at right angles to a bottom of the groove.

9. The tubular connection of claim 1, wherein shoulders of the at least one groove are substantially at an obtuse angle to a bottom of the groove.

10. The tubular connection of claim 9, wherein the angle is in a range from about 30 degrees to about 45 degrees with respect to the groove bottom.

11. The tubular connection of claim 1, wherein a depth of the at least one groove is selected to provide a minimum cross-sectional area of the box member proximate the at least one groove of about 1.10 to about 1.25 times a critical section area of the connection.

12. The tubular connection of claim 1, further comprising at least one pin groove formed on an outer surface of the pin member between a last engaged thread and a pin nose, the at least one pin groove adapted to reduce an amount of radially inward deformation of the pin member upon radial plastic expansion of the connection.

13. The tubular connection of claim 1, further comprising at least one substantially helical groove formed on an inner surface of the pin member, the substantially helical groove positioned at substantially a same axial position along the pin member as roots of the external thread, the at least one substantially helical groove adapted to reduce an amount of radially inward deformation of the pin member upon radial plastic expansion of the connection.

14. The tubular connection of claim 1, further comprising a plurality of circumferential pin grooves formed on an inner surface of the pin member, each of the plurality of substantially circumferential pin grooves positioned at substantially a same axial position along the pin member as a root of the external thread, the plurality of circumferential pin grooves adapted to reduce an amount of radially inward deformation of the pin member upon radial plastic expansion of the connection.

15. The tubular connection of claim 1, further comprising at least one substantially helical groove formed proximate a root surface of the external thread, the at least one substantially helical groove adapted to reduce an amount of axial and radial deformation of the external thread upon radial plastic expansion of the connection.

16. A radially expandable tubular connection comprising:
   a box member comprising an internal thread and a first seal surface;
   a pin member comprising an external thread and a second seal surface, the external thread adapted to threadedly engage the internal thread and the first and second seal surfaces adapted to form a metal-to-metal seal upon engagement thereof; and
   at least one groove formed on an outer surface of the box member axially proximate the first seal surface, the at least one groove shaped so that the box member radially deforms in a direction toward the pin member axially proximate the metal-to-metal seal upon radial plastic expansion of the pin and box members after engagement of the threads.

17. The tubular connection of claim 16, wherein the internal thread and the external thread comprise generally dovetail-shaped threads.

18. The tubular connection of claim 16, wherein the first and second seal surfaces are adapted to form a substantially cylindrical contact region upon radial expansion of the pin and box members.

19. The tubular connection of claim 16, wherein a width of the at least one groove is approximately equal to a length of the seal surfaces.

20. The tubular connection of claim 16, wherein the at least one groove comprises a substantially rectangular cross-section.

21. The tubular connection of claim 16, wherein the at least one groove comprises a substantially hemispherical cross-section.

22. The tubular connection of claim 16, wherein shoulders of the at least one groove are substantially at right angles to a bottom of the groove.

23. The tubular connection of claim 16, wherein shoulders of the at least one groove are substantially at an obtuse angle to a bottom of the groove.

24. The tubular connection of claim 23, wherein the angle is in a range from about 30 degrees to about 45 degrees with respect to the groove bottom.

25. The tubular connection of claim 1, wherein a depth of the at least one groove is selected to provide a minimum cross-sectional area of the box member proximate the at least one groove of about 1.10 to about 1.25 times a critical section area of the connection.

26. A radially expandable tubular connection comprising:
   a box member comprising an internal thread and a first seal surface;
   a pin member comprising an external thread and a second seal surface, the external thread adapted to threadedly engage the internal thread and the first and second seal surfaces adapted to form a metal-to-metal seal upon radial plastic expansion of the pin and box members after engagement of the threads; and
   at least one groove formed on an inner surface of the box member, the at least one groove adapted so that the box member radially deforms in a direction toward the pin member proximate the seal surfaces after the radial plastic expansion.

27. The tubular connection of claim 26, wherein the internal thread and the external thread comprise generally dovetail-shaped threads.

28. The tubular connection of claim 26, wherein the at least one groove is axially positioned along the box member proximate the seal surfaces.

29. The tubular connection of claim 26, wherein the first and second seal surfaces are adapted to form a substantially cylindrical contact region upon radial expansion of the pin and box members.

30. The tubular connection of claim 26, wherein a width of the at least one groove is approximately equal to a length of the seal surfaces.

31. The tubular connection of claim 26, wherein the at least one groove comprises a substantially rectangular cross-section.

32. The tubular connection of claim 26, wherein the at least one groove comprises a substantially hemispherical cross-section.

33. The tubular connection of claim 26, wherein shoulders of the at least one groove are substantially at right angles to a bottom of the groove.

34. The tubular connection of claim 26, wherein shoulders of the at least one groove are substantially at an obtuse angle to a bottom of the groove.

35. The tubular connection of claim 34, wherein the angle is in a range from about 30 degrees to about 45 degrees with respect to the groove bottom.

36. The tubular connection of claim 26, wherein a depth of the at least one groove is selected to provide a minimum cross-sectional area of the box member proximate the at least one groove of about 1.10 to about 1.25 times a critical section area of the connection.

37. A radially expandable tubular connection comprising
   a box member comprising an internal threat and a first seal surface;
   a pin member comprising a external thread and a second seal surface, the external thread adapted to engage the internal thread and the first and second seal surfaces adapted to form a metal-to-metal seal; and
   at least one groove formed on a surface of the box member, the at least one groove shaped so that the box member radially deforms in a direction toward the pin member proximate the seal surfaces upon radial plastic expansion.

* * * * *